United States Patent
Saravanan et al.

(10) Patent No.: US 12,499,441 B2
(45) Date of Patent: Dec. 16, 2025

(54) SYSTEM AND METHOD FOR PAYMENT HARDWARE SYSTEM MODULE (HSM) INTEGRATION

(71) Applicant: Marvell Asia Pte Ltd, Singapore (SG)

(72) Inventors: Dhanalakshmi Saravanan, Bangalore (IN); Ganeswara Rao Karri, Hyderabad (IN); Rajeshekhar Murtinty, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 152 days.

(21) Appl. No.: 18/471,242

(22) Filed: Sep. 20, 2023

(65) Prior Publication Data

US 2025/0094968 A1    Mar. 20, 2025

(51) Int. Cl.
 *G06F 15/16* (2006.01)
 *G06F 9/54* (2006.01)
 *G06Q 20/34* (2012.01)
 *G06Q 20/38* (2012.01)

(52) U.S. Cl.
 CPC ......... *G06Q 20/3829* (2013.01); *G06F 9/541* (2013.01); *G06Q 20/341* (2013.01)

(58) Field of Classification Search
 CPC ... G06Q 20/3829; G06Q 20/341; G06F 9/541
 USPC ........................................................ 709/203
 See application file for complete search history.

(56) References Cited

U.S. PATENT DOCUMENTS

| | | |
|---|---|---|
| 2014/0282936 A1 | 9/2014 | Fitzgerald et al. |
| 2019/0377621 A1* | 12/2019 | Huang ................... G06F 3/0484 |
| 2021/0065142 A1* | 3/2021 | Batra ....................... G06F 9/541 |
| 2021/0065291 A1* | 3/2021 | Gaivironsky ...... G06Q 20/3674 |
| 2022/0391856 A1* | 12/2022 | Anumulapally ...... G06F 21/602 |
| 2024/0184896 A1 | 6/2024 | Anumulapally et al. |
| 2024/0338684 A1 | 10/2024 | Tyagi et al. |

OTHER PUBLICATIONS

U.S. Appl. No. 18/507,920, entitled "System and Method for Payment Hardware System Module (HSM) Communications;" filed Nov. 13, 2023.
Walker, "What Is Payment HSM? And Its Benefits;" Mar. 17, 2023, retrieved from the Internet at https://coruzant.com/security/what-is-payment-hsm-and-its-benefits/.

* cited by examiner

*Primary Examiner* — Alan S Chou
(74) *Attorney, Agent, or Firm* — Hamilton, Brook, Smith & Reynolds, P.C.

(57) ABSTRACT

A system and corresponding method integrate a payment application and at least one payment hardware system module (HSM). The system comprises a payment system interface (PSI) interposed between a payment application and at least one payment hardware system module (HSM). The PSI implements a standard, payment HSM application programming interface (API) that is payment HSM vendor-agnostic. The PSI enables communication between the payment application and the at least one payment HSM based on the standard, payment HSM API implemented. Since the standard, HSM payment API is payment HSM vendor-agnostic, development effort otherwise expended to develop a connector for each vendor payment HSM integration is avoided.

24 Claims, 5 Drawing Sheets

JSON Request Format — 334

```
{
  "username": " ",
  "password": " ",
  "dec_key_type": " ",
  "dec_kb_type": " ",
  "dec_mode": " ",
  "dec_pad_type": " ",
  "dec_key_handle": " ",
  "encoded_pin": " ",
  "pin_format": " ",
  "trans_format": " ",
  "pan": " ",
  "enc_key_type": " ",
  "enc_kb_type": " ",
  "enc_mode": " ",
  "enc_pad_type": " ",
  "enc_key_handle": " "
}
```
— 335

FIG. 3A

JSON Response Format — 338

SUCCESS
```
{
  "status": " ",
  "Response": {
    "output": " ",
    "resp_code": " "
  }
}
```
— 340

FAILURE
```
{
  "status": " ",
  "Response": {
    "output": " ",
    "resp_code": " "
  }
}
```
— 342

SYSTEM AND METHOD FOR PAYMENT HARDWARE SYSTEM MODULE (HSM) INTEGRATION

BACKGROUND

Payment hardware security modules (HSMs) are specialized devices used for key management, encryption, authentication, and other security-related functions for non-limiting examples. Credit card transactions that occur around the world rely on HSMs. As people transition to cashless payment methods, securing their money and ensuring that only authorized people can transact on their behalf becomes increasingly useful and, thus, use of HSMs has increased.

For non-limiting example, an entity providing online payment services can use a payment hardware security module (HSM) to authenticate each transaction before allowing it to proceed. Since the payment HSM may generate all the data that pertains to a transaction, including cryptographic keys, card verification code (CVC) codes, and personal identification numbers (PINs), etc., the payment HSM can also authenticate all the codes for a transaction to identify whether an individual trying to make a payment or access funds is authorized to do so. Such functionality enhances payment security, especially when online fraud and hacking are widespread.

SUMMARY

According to an example embodiment, a system comprises a payment system interface (PSI) interposed between a payment application and at least one payment hardware system module (HSM). The PSI is configured to implement a standard, payment HSM application programming interface (API) that is payment HSM vendor-agnostic. The PSI is further configured to enable communication between the payment application and the at least one payment HSM based on the standard, payment HSM API implemented.

The communication enabled may include bi-directional communications.

A payment HSM of the at least one payment HSM may be configured to implement a native API. The native API may be a payment HSM vendor-specific API. The payment HSM may include at least one memory. The at least one memory may be configured to store a PSI library. The PSI library may be based on the standard, payment HSM API. The payment HSM may be further configured to use the PSI library stored to convert at least one standard, payment HSM API request of the standard, payment HSM API to at least one native API request of the native API and vice versa. The payment HSM may be further configured to use the PSI library stored to convert at least one native API response of the native API to at least one standard, payment HSM API response of the standard, payment HSM API and vice versa.

The at least one payment HSM may include a plurality of payment hardware system modules (HSMs) with respective native application programming interfaces (APIs) and respective PSI libraries. The respective PSI libraries may be based on the standard, payment HSM API.

A payment HSM of the at least one payment HSM may be a cloud HSM for non-limiting example.

The standard, payment HSM API may be a representational state transfer (REST) API or other type of API for non-limiting examples.

The standard, payment HSM API may be based on JavaScript® Object Notation (JSON) or another format for non-limiting examples.

The standard, payment HSM API may include at least one standard, payment HSM API request or API response that is based on a tag-length-value (TLV) construction for non-limiting example.

The system may be a cloud-based system for non-limiting example.

The system may be implemented on an integrated circuit (IC) chip for non-limiting example. The IC chip may be configured to store subscriber identity data or other data, securely, based on at least one standard, payment HSM API request of the standard, payment HSM API.

According to another example embodiment, a method may comprise implementing a standard, payment hardware system module (HSM) application programming interface (API) at a payment system interface (PSI). The PSI is interposed between a payment application and at least one payment HSM. The payment HSM API is payment HSM vendor-agnostic. The method may further comprise enabling, at the PSI, communication between the payment application and the at least one payment HSM. The enabling may be based on the standard, payment HSM API implemented.

Alternative method embodiments parallel those described above in connection with the example system embodiment.

According to another example embodiment, a non-transitory computer-readable medium has encoded thereon a sequence of instructions which, when loaded and executed by at least one processor, causes the at least one processor to implement a standard, payment hardware system module (HSM) application programming interface (API) at a payment system interface (PSI). The PSI is interposed between a payment application and at least one payment HSM. The payment HSM API is payment HSM vendor-agnostic. The sequence of instructions further causes the at least one process to enable, at the PSI, communication between the payment application and the at least one payment HSM. The enabling is based on the standard, payment HSM API implemented.

Alternative non-transitory computer-readable medium embodiments parallel those described above in connection with the example system embodiment.

According to another example embodiment, an apparatus comprises means for implementing a standard, payment hardware system module (HSM) application programming interface (API) between a payment application and at least one payment HSM. The payment HSM API is payment HSM vendor-agnostic. The apparatus further comprises means for enabling communication between the payment application and the at least one payment HSM. The enabling is based on the standard, payment HSM API implemented.

Alternative apparatus embodiments parallel those described above in connection with the example system embodiment.

It should be understood that example embodiments disclosed herein can be implemented in the form of a method, apparatus, system, or non-transitory, computer-readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A standard application programming interface (API) that is "vendor-agnostic" is a non-propriety API that is defined irrespective of a native API defined by a vendor. As such, a standard, vendor-agnostic API is not vendor-specific. Further, the term "native" may be referred to interchangeably herein as "proprietary."

Payment systems worldwide have permitted online and offline financial transactions for many decades. Payment systems depend heavily on reliable security which is primarily guided by major credit card brands and country-specific central banks. Understanding the importance of standardization, major card brands collaborated to form the Payment Card Industry Security Standards Council (PCI SSC) to protect the card payment environments by certifying the payment terminals and payment hardware security modules (HSMs) used for processing sensitive data. There is no standard interface available, however, with PCI SSC for payment HSM crypto services. Lack of a standard forces the applications that employ same to develop a connector for each HSM vendor integration.

A payment application integrates, conventionally, with a payment HSM using a native API of the payment HSM, directly. As such, integration of a payment application with different payment hardware-security modules (HSMs) relies on development of a separate connector (interface) for each payment HSM, resulting in manifold development and maintenance efforts. An example embodiment disclosed herein includes a payment security interface (PSI) that is payment HSM vendor-agnostic. An example embodiment of such an interface standardizes the application calls to payment HSMs, as disclosed below with regard to FIG. 1.

Figure 1:
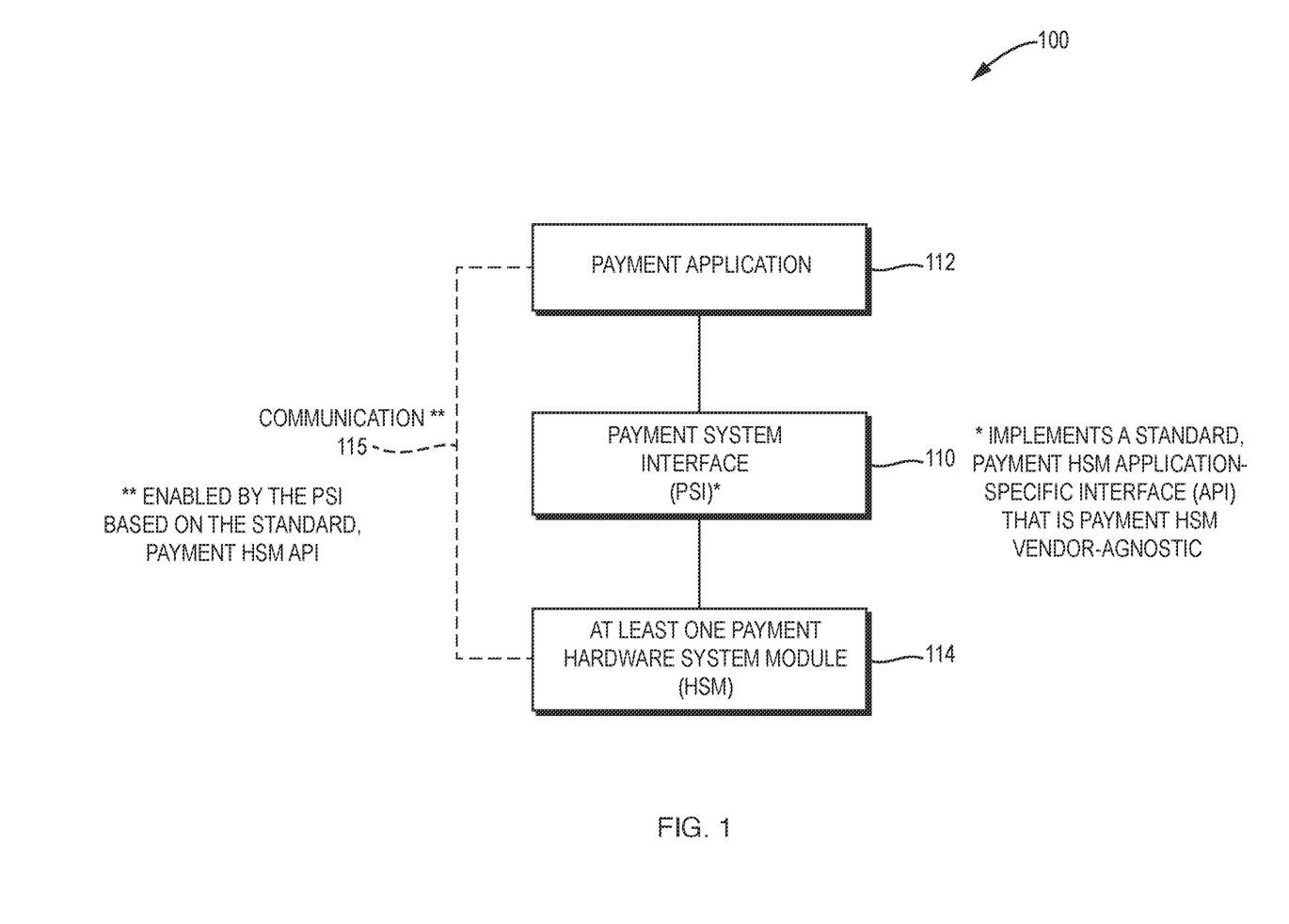
FIG. 1 is a block diagram of an example embodiment of a system for integrating a payment application and at least one payment hardware security module (HSM).

FIG. 1 is a system 100 that comprises a payment system interface (PSI) 110 interposed between a payment application 112 and at least one payment HSM 114. The PSI 110 is configured to implement a standard, payment HSM application programming interface (API) (not shown) that is payment HSM vendor-agnostic. The PSI 110 is further configured to enable communication 115 between the payment application 112 and the at least one payment HSM 114 based on the standard, payment HSM API implemented.

In the example embodiment of FIG. 1, the payment application 112 need not know the respective native API of an HSM of the least one HSM 114. In the system 100, each payment HSM of the at least one HSM 114 may be configured to offer Payment Card Industry (PCI) compliant key management, acquirer, interchange, and issuer services for non-limiting examples. The PSI interface 110, with the standard, payment HSM API, may be developed in accordance with such PCI compliant services.

The PSI interface 110 with the standard, payment HSM API offers quick customer acquisition because development effort otherwise expended to develop an interface for a payment application to communicate with each vendor's native API is avoided. Payment applications, such as the payment application 112, can easily migrate to interface with different payment HSMs.

In general, HSM service providers, such as payment service providers, and end users, such as payment application developers, prefer standard interfaces to integrate their applications. According to an example embodiment, an HSM of the at least one payment HSM 114 may be a payment crypto processing HSM. A standard interface, such as the PSI 110, enables a payment service provider to integrate their application, such as the payment application 112, with the payment crypto processing HSM. Such integration is enabled via the standard, payment HSM API that is vendor-agnostic. The PSI 110 that implements same is useful because such an interface eliminates the need to develop a specific connector to integrate with the payment crypto processing HSM of a vendor, or with any other type of payment HSM of a vendor.

The system 100 may be a cloud-based system for non-limiting example. According to another example embodiment, the system 100 may be implemented on an integrated circuit (IC) chip for non-limiting example. The system 100, implemented as the cloud-based system or IC chip may, for non-limiting example, be configured to store subscriber identity data or other data, securely, based on at least one standard, payment HSM API request of the standard, payment HSM API.

Since the PSI 110 is configured to implement the standard, payment HSM API that is payment HSM vendor-agnostic, the PSI 100 standardizes the application calls of the payment application 112 to a payment HSM of the at least one HSM 114. As such, the payment application 112 need not know or conform to the HSM native application programming interfaces (APIs) of each HSM of the at least one HSM 114 as disclosed below with regard to FIG. 2.

Figure 2:
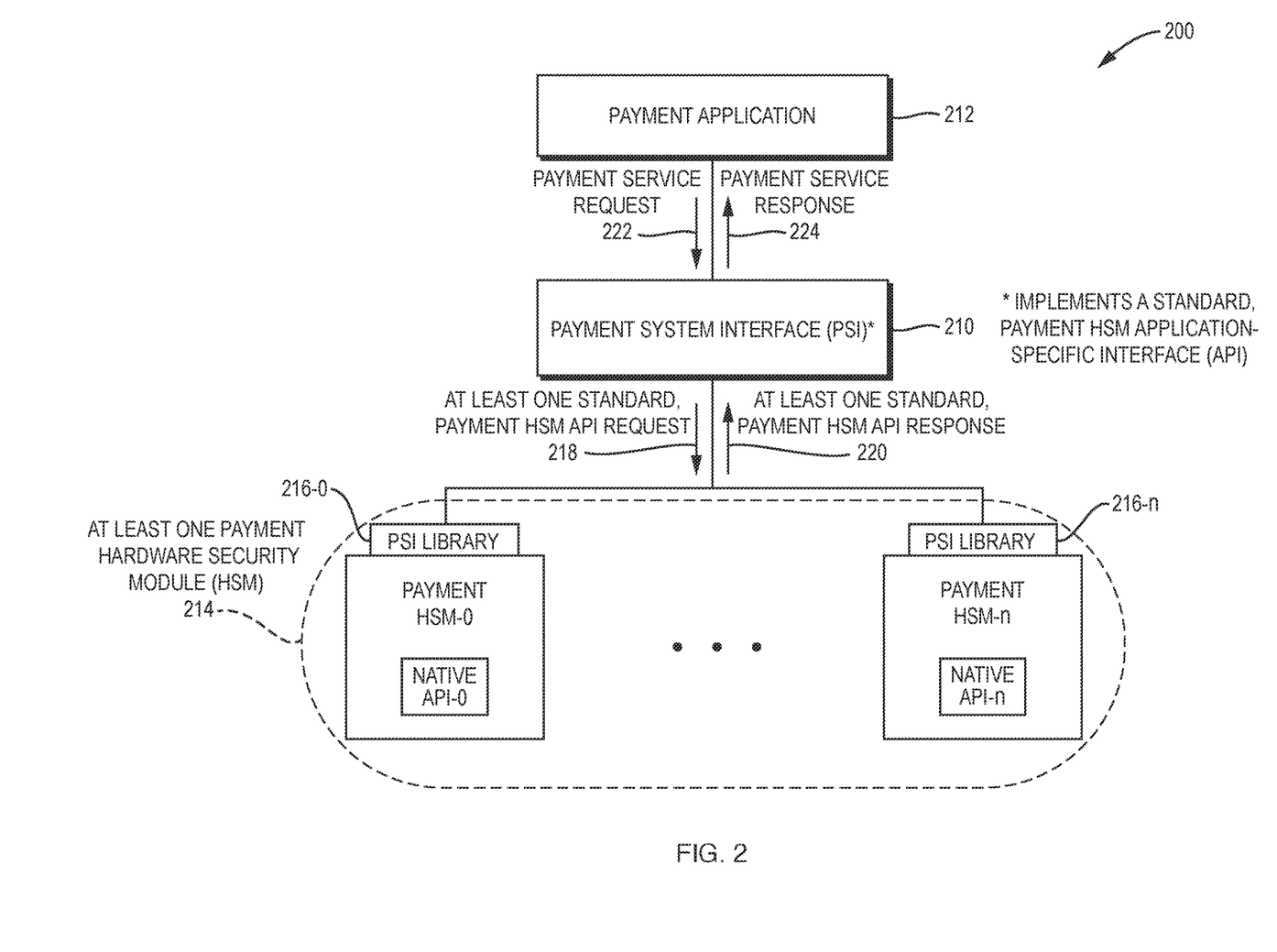
FIG. 2 is a block diagram of another example embodiment of a system for integrating a payment application and at least one payment HSM.

FIG. 2 is a block diagram of an example embodiment of a system 200. The system 200 may be employed as the system 100 of FIG. 1, disclosed above. Continuing with FIG. 2, the system 200 comprises a payment system interface (PSI) 210 interposed between a payment application 212 and at least one payment hardware system module (HSM) 214. The PSI is configured to implement a standard, payment HSM application programming interface (API) (not shown) that is payment HSM vendor-agnostic. The PSI 210 is further configured to enable communication (not shown) between the payment application 212 and the at least one payment HSM 214 based on the standard, payment HSM API implemented. The communication enabled may include bi-directional communications (not shown).

As such, application and cloud developers may employ generic PSI APIs, that is APIs of the standard, payment HSM API of the PSI 210, without binding to the respective native (propriety) payment HSM vendor APIs. Thus, if a cloud service provider moves (migrates) from use of a present payment HSM vendor to a next payment HSM vendor, such migration can be performed without changing the code of their payment application 212.

According to an example embodiment, the at least one payment HSM 214 may include a plurality of payment hardware system modules (HSMs), such as the payment HSM-0, . . . , and payment HSM-n, with respective native APIs, such as the native API-0, . . . , and native API-n, and respective PSI libraries, such as the PSI library 216-0, . . . , and PSI library 216-n. The respective PSI libraries may be based on the standard, payment HSM API. As such, the respective PSI libraries may be considered as being "in sync" (e.g., compatible) with the standard, payment HSM API. An effort to add a PSI library to a payment HSM may include development of the PSI library as well as testing of the PSI library with each new release (e.g., new version) of the payment HSM.

A payment HSM of the at least one payment HSM 214 may be configured to implement a native API. For example, the at least one HSM 214 includes the payment HSM-0, . . . , and payment HSM-n, in the non-limiting example embodiment of FIG. 2. Such payment hardware system modules (HSMs) may be from different vendors (not shown) and may implement respective native APIs, namely the native API-0, . . . , and native API-n, of the payment HSM-0, . . . , and payment HSM-n, respectively. The respective native APIs may be specific to respective vendors (not shown). As such, the native API may be a payment HSM vendor-specific API.

The payment HSM (e.g., payment HSM-0, . . . , or payment HSM-n) may include at least one memory (not shown). The at least one memory may be configured to store a PSI library, such as the PSI library 216-0, . . . , or PSI library 216-n. The PSI library (e.g., PSI library 216-0, . . . , or PSI library 216-n) may be based on the standard, payment HSM API. The payment HSM (e.g., payment HSM-0, . . . , or payment HSM-n) may be further configured to use the PSI library (e.g., PSI library 216-0, . . . , or PSI library 216-n) stored to convert at least one standard, payment HSM API request 218 of the standard, payment HSM API to at least one native API request (not shown) of the native API (e.g., native API-0, . . . , or native API-n) and vice versa. The payment HSM (e.g., payment HSM-0, . . . , or payment HSM-n) may be further configured to use the PSI library (e.g., PSI library 216-0, . . . , or PSI library 216-n) stored to convert at least one native API response (not shown) of the native API (e.g., native API-0, . . . , native API-n) to at least one standard, payment HSM API response 222 of the standard, payment HSM API, and vice-versa.

For non-limiting example, the at least one standard, payment HSM API request 218 may represent a payment service request 222 of the payment application 212. The at least one standard, payment HSM API response 222 may represent a payment service response 224 to the payment service request 222.

A payment HSM of the at least one payment HSM 214 may be a cloud HSM for non-limiting example. The standard, payment HSM API may be a representational state transfer (REST) API or other type of API for non-limiting examples. The standard, payment HSM API may be based on JavaScript Object Notation (JSON), such as disclosed below with regard to FIG. 3A and FIG. 3B.

Figure 3A:
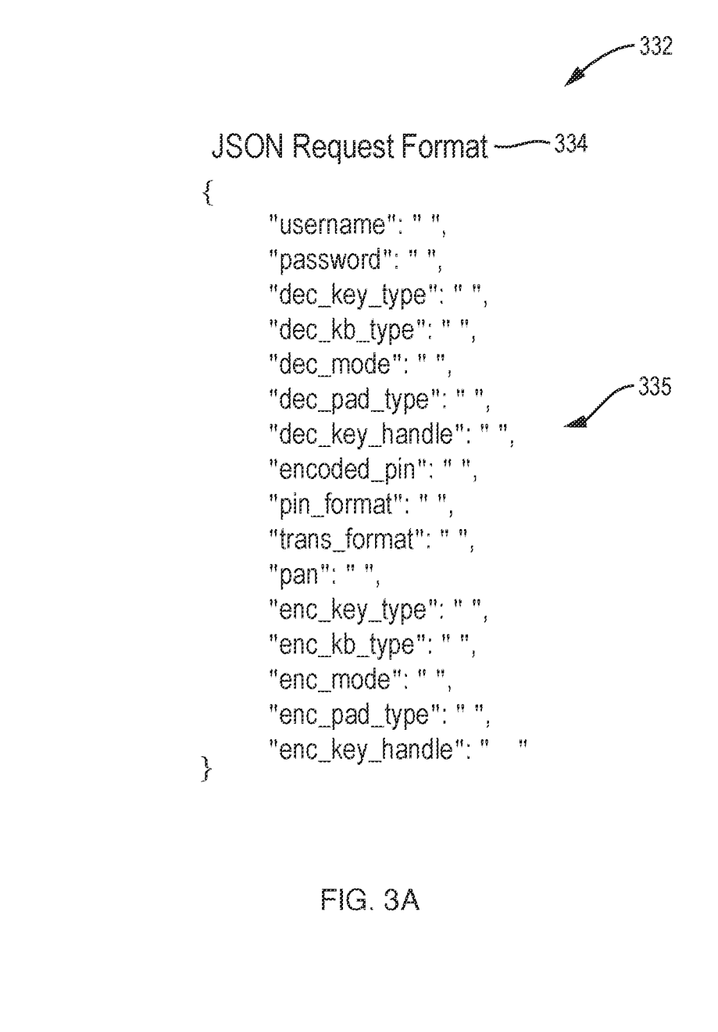
FIG. 3A is a data structure that represents an example embodiment of a JavaScript Object Notation (JSON) request format that may be employed for an application programming interface (API) request of a standard, payment HSM API.

FIG. 3A is a data structure 332 that represents an example embodiment of a JSON request format 334 that may be employed for an application programming interface (API) request of the standard, payment HSM API, disclosed above.

Continuing with reference to FIG. 3A, the fields 335 of the data structure 332 are for non-limiting example.

The JSON request format 334 may also be referred to as a PSI format. The non-limiting example of the JSON request format 334 may be employed as a PSI API of the standard, HSM API, disclosed above. Such a PSI API may be employed for personal identification number (PIN) translation for non-limiting example. With reference to FIG. 2 and FIG. 3A, such PSI API may be used by the payment application 212 for PIN translation irrespective of the underlying payment HSM of the at least one payment HSM 214 targeted to perform such translation.

Figure 3B:
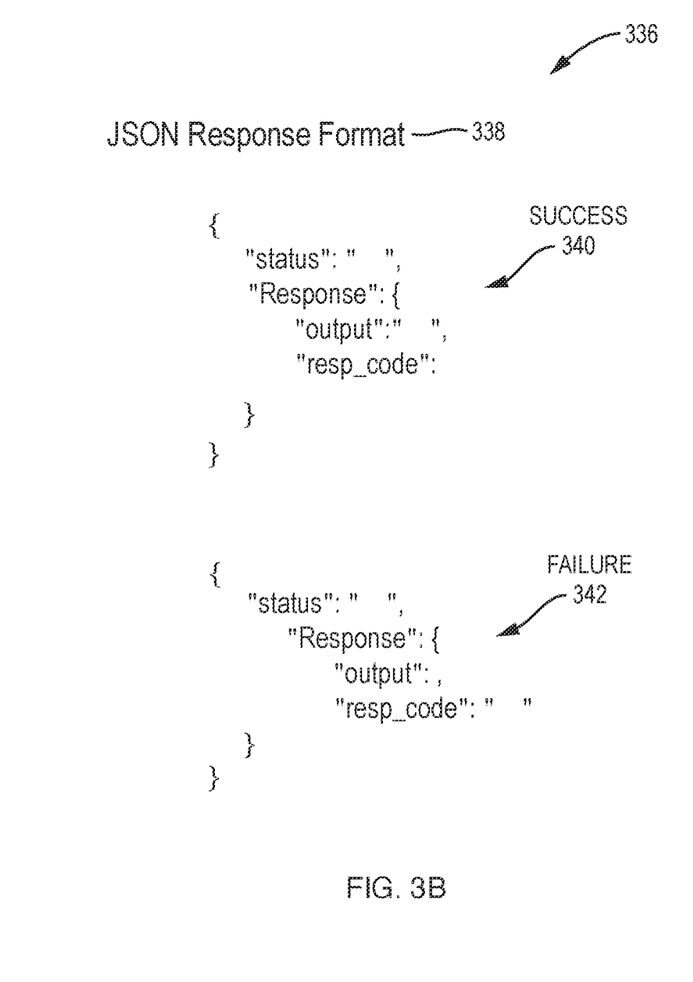
FIG. 3B is a data structure that represents an example embodiment of a JSON response format that may be employed for an API response of the standard, payment HSM API.

The respective PSI library of the targeted payment HSM of the at least one payment HSM 214 may be used by such payment HSM to convert the PSI API to its own API format of its native API. FIGS. 3A and 3B provide a non-limiting example of a PIN translation API with a standard definition in JSON format (formation) that may be converted to a native API as shown below for non-limiting example. Such a format of a native API may be structured as follows by a first payment HSM of the at least one payment HSM 214 for non-limiting example:

```
uint32_tisPayTranslatePIN (
    PayHandle *IsPayHandle,
    PayKeyInfo *decKey Info,
    PayPinBlkInfo *pinBlkInfo,
    PayKeyInfo *endKeyInfo,
    PayPinInfo *outPinInfo,
    Uint32_t *outPinBlkLen,
    Uint8 *OutPinBlk);
```

The above model may be followed for all the APIs defined in the standard interface.

At a second payment HSM of the at least one payment HSM, however, the respective PSI library of the second payment HSM may be used by the second payment HSM to convert the JSON request format 334 to its own, native API format, such as: 0008JG02650331EDA60E60112345678901214123 48D665AC5A3" for non-limiting example. Such respective PCI libraries may also be used for converting to a response format of an API of the standard, payment HSM API, such as the response format disclosed below with regard to FIG. 3B for non-limiting example.

FIG. 3B is a data structure 336 that represents an example embodiment of a JSON response format 338 that may be employed for an API response of the standard, payment HSM API, disclosed above. Continuing with reference to FIG. 3B, fields of the data structure 336 used for communicating success 340 of the API response are for non-limiting example. Similarly, fields of the data structure 336 used for communicating failure 342 of the API response are for non-limiting example.

The standard, payment HSM API may enable payment system operations categorized as follows for non-limiting examples: 1. Key Management (e.g., generate key, export key, import key, derive key, etc.); 2. PIN Processing (e.g., derive PIN, verify PIN, translate PIN, etc.); 3. Card Processing (e.g., generate card value, verify card value, etc.); 3. Data Processing (e.g., encrypt data, decrypt data, translate data, etc.). The above-noted payment system operations may adhere to a rule(s), and request and response operations may include a parameter(s). For non-limiting example, such a rule(s) may include a rule that all PINs and keys passed through the PSI be decrypted and not passed in clear (non-encrypted) format. For non-limiting examples, such a rule(s) may include a rule that there be a corresponding response for each request to the HSM and/or a rule that an authenticated session be established with the HSM for processing payment data. Regarding a request/response operation parameter(s), a request operation may include a session ID, session token, and/or an input value(s) for non-limiting examples, whereas a response operation may include a response value(s) for non-limiting example.

As disclosed above, the standard, payment HSM API may be based on JSON for non-limiting example. According to another non-limiting example embodiment, the standard, payment HSM API may include at least one standard, payment HSM API request or API response that is based on a tag-length-value (TLV) construction (not shown). Regardless of the format, the payment HSM API is payment HSM vendor-agnostic. Since the standard, HSM payment API is payment HSM vendor-agnostic, development effort otherwise expended to develop a connector for each vendor payment HSM integration is avoided. An example embodiment of a method that enables integration of a payment application and at least one payment HSM in a manner that is payment HSM vendor-agnostic is disclosed below with regard to FIG. 4.

Figure 4:
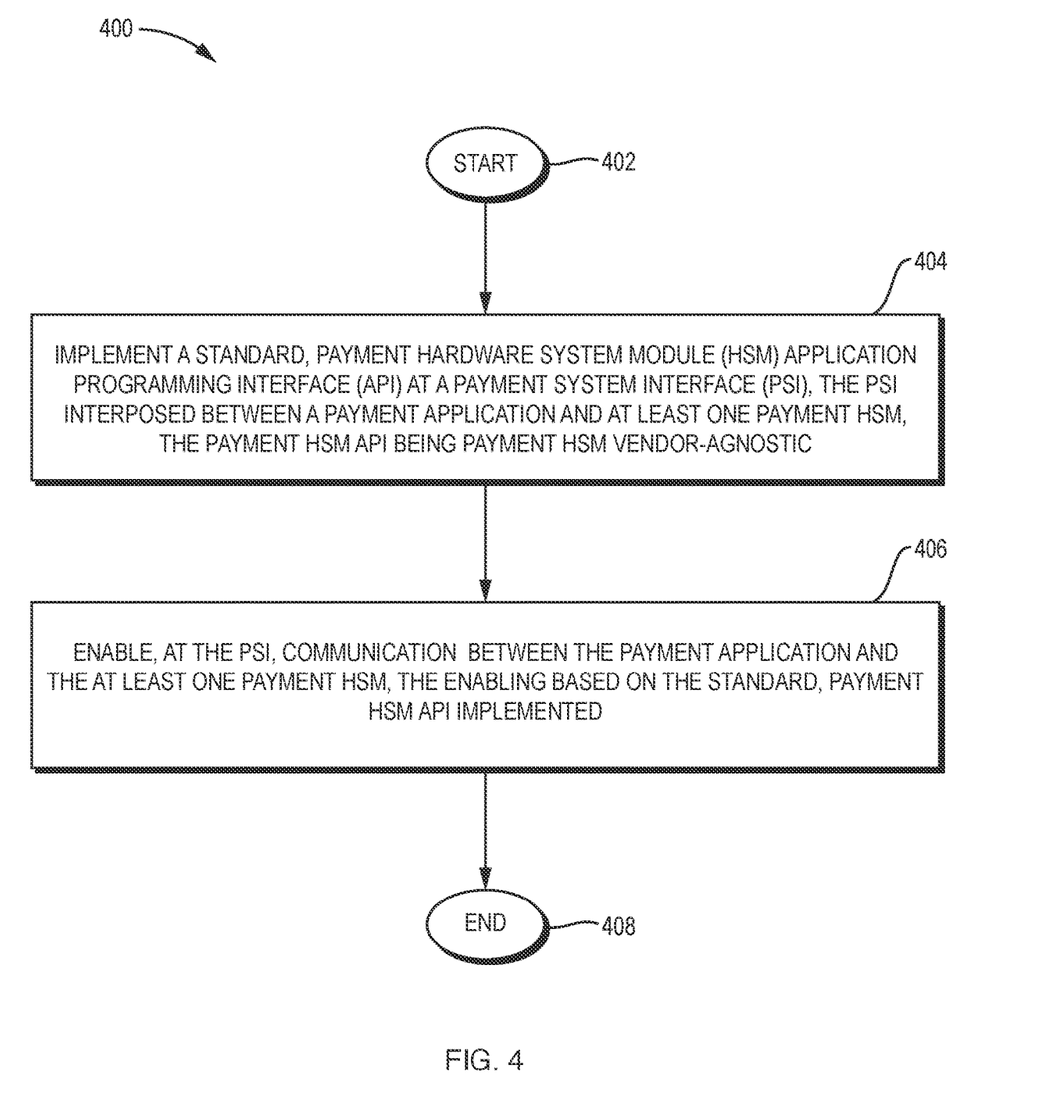
FIG. 4 is a flow diagram of an example embodiment of a method for integrating a payment application and at least one HSM.

FIG. 4 is a flow diagram 400 of an example embodiment of a method. The method begins (402) and comprises implementing a standard, payment hardware system module (HSM) application programming interface (API) at a payment system interface (PSI) (404). The PSI is interposed between a payment application and at least one payment HSM. The payment HSM API is payment HSM vendor-agnostic. The method further comprises enabling, at the PSI, communication between the payment application and the at least one payment HSM (406). The enabling may be based on the standard, payment HSM API implemented. The method thereafter ends (408) in the example embodiment.

Figure 5:
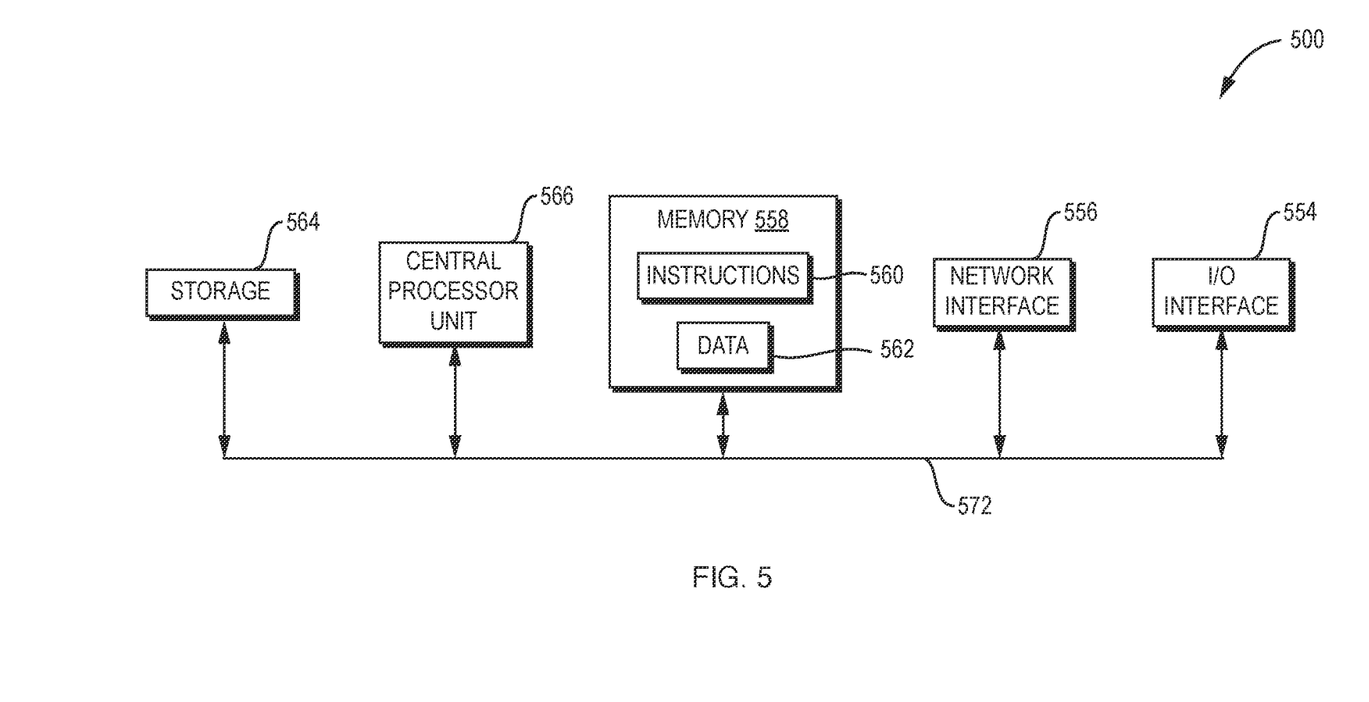
FIG. 5 is a block diagram of an example internal structure of a computer optionally within an embodiment disclosed herein.

FIG. 5 is a block diagram of an example of the internal structure of a computer 500 in which various embodiments of the present disclosure may be implemented. The computer 500 contains a system bus 552, where a bus is a set of hardware lines used for data transfer among the components of a computer or digital processing system. The system bus 552 is essentially a shared conduit that connects different elements of a computer system (e.g., processor, disk storage, memory, input/output ports, network ports, etc.) that enables the transfer of information between the elements. Coupled to the system bus 552 is an I/O device interface 554 for connecting various input and output devices (e.g., keyboard, mouse, display monitors, printers, speakers, etc.) to the computer 500. A network interface 556 allows the computer 500 to connect to various other devices attached to a network (e.g., global computer network, wide area network, local area network, etc.). Memory 558 provides volatile or non-volatile storage for computer software instructions 560 and data 562 that may be used to implement embodiments (e.g., method of the flow diagram 400) of the present disclosure, where the volatile and non-volatile memories are examples of non-transitory media. Disk storage 564 provides non-volatile storage for computer software instructions 560 and data 562 that may be used to implement embodiments (e.g., method of the flow diagram 400) of the present disclosure. A central processor unit 566 is also coupled to the system bus 552 and provides for the execution of computer instructions.

As used herein, the term "interface" or "layer" may refer to any hardware, software, firmware, electronic control component, processing logic, and/or processor device, individually or in any combination, including without limitation: an application-specific integrated circuit (ASIC), a field-programmable gate array (FPGA), an electronic circuit, a processor and memory that executes one or more software or firmware programs, and/or other suitable components that provide the described functionality. According to a non-limiting example embodiment, a "interface" or "layer" may include at least one processor and at least one memory with computer code instructions stored thereon. The at least one processor and the at least one memory, with computer code instructions, may be configured to cause the interface or layer to perform its respective configured functions.

Example embodiments disclosed herein may be configured using a computer program product; for example, controls may be programmed in software for implementing example embodiments. Further example embodiments may include a non-transitory, computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:
1. A system comprising:
at least one processor; and
at least one memory with computer code instructions stored thereon, the at least one processor and the at least one memory, with the computer code instructions, configured to implement a payment system interface (PSI) interposed between a payment application and at least one payment hardware system module (HSM), the PSI configured to implement a standard, payment HSM application programming interface (API) that is payment HSM vendor-agnostic,
the PSI further configured to enable communication between the payment application and the at least one payment HSM based on the standard, payment HSM API implemented and to communicate at least one standard, payment HSM API request, of the standard, payment HSM API implemented, to a payment HSM of the at least one payment HSM.
2. The system of claim 1, wherein the communication enabled includes bi-directional communications.

3. The system of claim 1, wherein the payment HSM of the at least one payment HSM is configured to implement a native API, wherein the native API is a payment HSM vendor-specific API, wherein the payment HSM includes at least one memory, wherein the at least one memory is configured to store a PSI library, wherein the PSI library is based on the standard, payment HSM API, and wherein the payment HSM is further configured to use the PSI library stored to:
  convert the at least one standard, payment HSM API request of the standard, payment HSM API to at least one native API request of the native API and vice versa; and
  convert at least one native API response of the native API to at least one standard, payment HSM API response of the standard, payment HSM API and vice versa.

4. The system of claim 1, wherein the at least one payment HSM includes a plurality of payment hardware system modules (HSMs) with respective native application programming interfaces (APIs) and respective PSI libraries and wherein the respective PSI libraries are based on the standard, payment HSM API.

5. The system of claim 1, wherein a payment HSM of the at least one payment HSM is a cloud HSM.

6. The system of claim 1, wherein the standard, payment HSM API is a representational state transfer (REST) API or other type of API.

7. The system of claim 1, wherein the standard, payment HSM API is based on JavaScript Object Notation (JSON) or another format.

8. The system of claim 1, wherein the standard, payment HSM API includes a standard, payment HSM API request of the at least one standard, payment HSM API request or at least one standard, payment HSM API response that is based on a tag-length-value (TLV) construction.

9. The system of claim 1, wherein the system is a cloud-based system.

10. The system of claim 1, wherein the system is implemented on an integrated circuit (IC) chip.

11. The system of Claim 10, wherein the IC chip is configured to store subscriber identity data or other data, securely, based on a standard, payment HSM API request of the at least one standard, payment HSM API request of the standard, payment HSM API.

12. A method comprising:
  implementing a standard, payment hardware system module (HSM) application programming interface (API) at a payment system interface (PSI), the PSI interposed between a payment application and at least one payment HSM, the payment HSM API being payment HSM vendor-agnostic;
  enabling, at the PSI, communication between the payment application and the at least one payment HSM, the enabling based on the standard, payment HSM API implemented; and
  communicating at least one standard, payment HSM API request, of the standard, payment HSM API implemented, to a payment HSM of the at least one payment HSM.

13. The method of claim 12, wherein the communication enabled includes bi-directional communications.

14. The method of claim 12, further comprising:
  implementing a native API by the payment HSM of the at least one payment HSM, wherein the native API is payment HSM vendor-specific API;
  storing a PSI library and, based on the PSI library stored:
  converting, by the payment HSM, the at least one standard, payment HSM API request of the standard, payment HSM API to at least one native API request of the native API and vice versa; and
  converting, by the payment HSM, at least one native API response of the native API to at least one standard, payment HSM API response of the standard, payment HSM API and vice versa.

15. The method of claim 12, wherein the at least one payment HSM includes a plurality of payment hardware system modules (HSMs) with respective native application programming interfaces (APIs) and respective PSI libraries and wherein the respective PSI libraries are based on the standard, payment HSM API.

16. The method of claim 12, wherein a payment HSM of the at least one payment HSM is a cloud HSM.

17. The method of claim 12, wherein the standard, payment HSM API is a representational state transfer (REST) API or other type of API.

18. The method of claim 12, wherein the standard, payment HSM API is based on JavaScript Object Notation (JSON) or another format.

19. The method of claim 12, wherein the standard, payment HSM API includes a standard, payment HSM API request of the at least one standard, payment HSM API request or at least one standard, payment HSM API response that is based on a tag-length-value (TLV) construction.

20. The method of claim 12, further comprising implementing the PSI and enabling the bi-directional communications on a cloud-based system.

21. The method of claim 12, further comprising implementing the PSI and enabling the communication on an integrated circuit (IC) chip.

22. The method of Claim 21, further comprising storing subscriber identity data or other data, securely, on the IC chip based on a standard, payment HSM API request of the at least one standard, payment HSM API request of the standard, payment HSM API.

23. A non-transitory computer-readable medium having encoded thereon a sequence of instructions which, when loaded and executed by at least one processor, causes the at least one processor to:
  implement a standard, payment hardware system module (HSM) application programming interface (API) at a payment system interface (PSI), the PSI interposed between a payment application and at least one payment HSM, the payment HSM API being payment HSM vendor-agnostic;
  enable, at the PSI, communication between the payment application and the at least one payment HSM, the enabling based on the standard, payment HSM API implemented; and
  communicate at least one standard, payment HSM API request, of the standard, payment HSM API implemented, to a payment HSM of the at least one payment HSM.

24. An apparatus comprising:
  means for implementing a standard, payment hardware system module (HSM) application programming interface (API) between a payment application and at least one payment HSM, the payment HSM API being payment HSM vendor-agnostic;
  means for enabling communication between the payment application and the at least one payment HSM, the enabling based on the standard, payment HSM API implemented; and means for communicating at least one standard, payment HSM API request, of the standard, payment HSM API implemented, to a payment HSM of the at least one payment HSM.

\* \* \* \* \*